US009003998B2

(12) United States Patent
Guillauminaud (10) Patent No.: US 9,003,998 B2
(45) Date of Patent: Apr. 14, 2015

(54) INDICATOR DEVICE AND DISPLAY DEVICE, PARTICULARLY FOR A MOTOR VEHICLE, AND NEEDLE MOUNTING METHOD FOR A DISPLAY DEVICE

(75) Inventor: Frédéric Guillauminaud, Cergy le Haut (FR)

(73) Assignee: Johnson Controls Technology Company, Holland, MI (US)

( * ) Notice: Subject to any disclaimer, the term of this patent is extended or adjusted under 35 U.S.C. 154(b) by 830 days.

(21) Appl. No.: 12/936,904

(22) PCT Filed: Apr. 7, 2009

(86) PCT No.: PCT/EP2009/002551
§ 371 (c)(1),
(2), (4) Date: Dec. 23, 2010

(87) PCT Pub. No.: WO2009/124712
PCT Pub. Date: Oct. 15, 2009

(65) Prior Publication Data
US 2011/0107959 A1  May 12, 2011

(30) Foreign Application Priority Data

Apr. 8, 2008  (DE) .......................... 10 2008 017 929
Oct. 24, 2008  (FR) ..................................... 08 05910
Dec. 15, 2008  (FR) ..................................... 08 07048

(51) Int. Cl.
*G01D 11/28* (2006.01)
*G01D 13/26* (2006.01)
(52) U.S. Cl.
CPC .............. *G01D 11/28* (2013.01); *G01D 13/265* (2013.01)

(58) Field of Classification Search
CPC ........ G12B 11/00; G12B 11/02; G12B 11/04; G01D 11/28; G01D 13/265; B23P 11/00
USPC .................. 116/286–288, 305, 334, DIG. 36; 362/26–30, 489, 511, 555, 362/23.09–23.13; 29/428
See application file for complete search history.

(56) References Cited

U.S. PATENT DOCUMENTS

| 4,878,453 A | * | 11/1989 | Inoue et al. | 116/288 |
| 5,414,595 A | * | 5/1995 | Oike et al. | 362/489 |
| 5,458,082 A | * | 10/1995 | Cookingham | 116/288 |
| 5,983,827 A | * | 11/1999 | Cookingham et al. | 116/288 |
| 6,189,480 B1 | * | 2/2001 | Staley et al. | 116/288 |
| 6,470,822 B2 | * | 10/2002 | Adams et al. | 116/284 |

(Continued)

FOREIGN PATENT DOCUMENTS

| EP | 0 785 416 B1 | 11/2002 |
| EP | 1 388 731 A | 2/2004 |

(Continued)

OTHER PUBLICATIONS

International Preliminary Report on Patentability mailed Nov. 9, 2010 in PCT/EP2009/002551, 12 pages.

(Continued)

*Primary Examiner* — R. A. Smith
*Assistant Examiner* — Tania Courson
(74) *Attorney, Agent, or Firm* — Foley & Lardner LLP (57) ABSTRACT

The present invention relates to an indicator device, a display device, particularly for a motor vehicle, and a needle mounting method for a display device.

15 Claims, 5 Drawing Sheets

(56) References Cited

U.S. PATENT DOCUMENTS

| | | | |
|---|---|---|---|
| 6,598,988 B1* | 7/2003 | Noll et al. | 362/26 |
| 6,601,532 B1* | 8/2003 | Olbrich | 116/288 |
| 6,854,416 B2* | 2/2005 | Breinich et al. | 116/202 |
| 6,981,464 B2* | 1/2006 | Birman et al. | 116/288 |
| 7,001,034 B1* | 2/2006 | Liu | 362/26 |
| 7,357,096 B2* | 4/2008 | Tane | 116/288 |
| 7,373,898 B1* | 5/2008 | Tenka | 116/328 |
| 7,562,637 B2* | 7/2009 | Mori et al. | 116/300 |
| 7,591,562 B2* | 9/2009 | Birman et al. | 362/23 |
| 7,675,428 B2* | 3/2010 | Pala et al. | 340/815.78 |
| 8,347,807 B2* | 1/2013 | Sigg et al. | 116/288 |
| 8,562,159 B2* | 10/2013 | Manivannan et al. | 362/23.21 |
| 8,579,448 B2* | 11/2013 | Frens | 362/23.21 |
| 2004/0089219 A1* | 5/2004 | Burau et al. | 116/288 |
| 2007/0035960 A1 | 2/2007 | Birman et al. | |

FOREIGN PATENT DOCUMENTS

| | | |
|---|---|---|
| EP | 1 510 791 A | 3/2005 |
| EP | 2 048 479 A | 4/2009 |
| FR | 2 871 564 A | 12/2005 |
| FR | 2 901 605 A | 11/2007 |
| WO | WO 2008/001605 A | 1/2008 |

OTHER PUBLICATIONS

International Search Report mailed Dec. 21, 2009 in PCT/EP2009/002551, 5 pages.

Office Action dated Oct. 13, 2014, in corresponding Korean Application No. 10-2010-7024945 and English translation, 17 pages.

* cited by examiner

INDICATOR DEVICE AND DISPLAY DEVICE, PARTICULARLY FOR A MOTOR VEHICLE, AND NEEDLE MOUNTING METHOD FOR A DISPLAY DEVICE

CROSS REFERENCE TO RELATED APPLICATIONS

This application is a National Stage application of PCT/EP2009/002551, filed on Apr. 7, 2009, which claims priority of German Patent Application No. 10 2008 017 929.9, filed Apr. 8, 2008, French Patent Application 08/05910, filed Oct. 24, 2008 and French Patent Application 08/07048, filed Dec. 15, 2008. The foregoing applications are incorporated by reference herein in their entirety.

The present invention relates to an indicator device with needle like those used notably on board motor vehicles for displaying the road speed or the engine speed of the vehicle. Moreover, the present invention relates to a display device, notably for a motor vehicle, and a method for assembling a needle for a display device.

In certain indicator devices, the illumination member comprises a light-emitting diode fixed to a free end of the needle. The powering of the light-emitting diode is made awkward because of the mobility of the needle.

An indicator device usually comprises a board in front of which a needle is mounted. Such an indicator device is for example known from document DE 29 02 009 A1. It is known practice to associate with the needle an illumination member making it easier to view the position of the needle relative to the dial and thus improving the legibility of the indicator device.

The needle is normally driven in rotary movement by a motor which comprises a shaft made of metal on which the needle is mounted. With such an embodiment, it is difficult to emit the light into the needle on the axis of rotation of the needle and consequently a multitude of various illumination members is necessary for illuminating the needle.

Moreover, the zone of the board in the vicinity of the drive shaft can be relatively cluttered, so the installation of a multitude of light-emitting diodes may be difficult.

Moreover, display devices are known, notably with needles for displaying for example the value of a road speed or rotation speed. It is also known practice to provide a needle on the rear face of a display surface of a display device. Document EP 0 785 416 B1 describes such a display device having a needle behind a display surface, notably to display an indication of a setpoint value on a dial.

Such hidden needles normally comprise a light guide to convey the light from a light source to the location where the information to be displayed must be displayed. In practice, leakages of light are frequent which reduces the brightness at the location where the information must be displayed and increases the need in required power from the light source.

A drawback of such display devices, according to the prior art, consists in the fact that there are too many light leaks and that the mechanical stability of the needle is insufficient.

A notable object of the present invention is to alleviate the drawbacks of the prior art, and notably those cited above, and it also has as its object to propose an indicator device with needle provided with a means for illuminating the needle that is simple and easy to position within the device and a display device comprising a needle that is stronger and more effective.

According to the present invention, an indicator device is proposed comprising a dial, a needle that can rotate about an axis and relative to the dial, the needle being provided with a light guide, the light guide having an entrance portion and an exit portion, the indicator device having at least one illumination member, the entrance portion and the illumination member being positioned on the axis of rotation.

Therefore, it is possible to position the illumination member in the immediate vicinity or opposite the needle, which simplifies the design of the indicator device and the structure resulting therefrom.

According to a preferred embodiment of the present invention, the entrance portion of the light guide is positioned opposite to the illumination member.

Through such an embodiment of the indicator device, it is advantageously possible to achieve a virtually direct transfer of the light from the illumination member to the entrance portion of the light guide of the needle.

According to another preferred embodiment of the present invention, the entrance portion and the illumination member are positioned in a centered manner on the axis of rotation.

Through such an embodiment of the indicator device, it is advantageously possible to achieve an illumination of the needle with the aid of a comparatively compact and low-cost illumination member.

According to yet another preferred embodiment of the present invention, the illumination member is positioned fixedly to a support element, notably a printed circuit board or a conducting plate.

Through such an embodiment of the indicator device, it is advantageously possible to produce the indicator device simply and with known assembly techniques.

According to yet another preferred embodiment of the present invention, the indicator device comprises a motor connected to the needle so as to be able to turn the needle about the axis of rotation, the motor being notably a stepping motor.

According to yet another preferred embodiment of the present invention, the motor is a motor with no rotation shaft or the motor is a motor with a rotation shaft having a recess.

According to yet another preferred embodiment of the present invention, the entrance portion of the light guide is positioned in the recess.

According to yet another preferred embodiment of the present invention, the needle is a needle of the bent type, notably a needle that extends from the axis radially toward a peripheral location of the indicator device in order subsequently to extend axially relative to the axis and to return radially over a portion of the distance between the axis of rotation and the peripheral location in order to produce an exit portion of the needle. Thus it is possible for a user of the indicator device to see the tip of the needle, even if the needle is not illuminated.

Moreover, the present invention proposes a display device, notably for a motor vehicle, comprising a display surface and a needle, the display surface having a front face directed toward a user and a rear face, the needle being provided on the rear face of the display surface, the needle comprising a light guide, the needle comprising at least one casing element, the casing element covering at least partially the light guide.

Through such an embodiment of a display device, it is advantageously possible to minimize the light leaks associated with the needle.

A particularly preferred enhancement of the invention lies in the fact that the needle comprises an end zone, an axial zone and a middle zone, the casing element surrounding the needle at least in its middle zone.

This allows the production of the display device with yet greater protection against light leaks.

Another preferred enhancement of the invention lies in the fact that the casing element comprises a top cover and a bottom cover.

Through such an embodiment of the needle, it is advantageously possible to ensure an easy and effective assembly method.

A preferred enhancement of the invention lies in the fact that the top cover surrounds the light guide for most of the end zone.

Through such an embodiment, it is advantageously possible to further reduce the light leaks from the light guide of the needle as claimed in the present invention.

Another preferred enhancement of the invention lies in the fact that the area of the cross section of the light guide is designed to be essentially constant between the end zone and the axial zone and that, notably, the cross section of the light guide is designed to be essentially round.

Through such an embodiment of the needle or of the light guide, it is advantageously possible to improve the conveyance of light to the end zone of the needle and notably to the tip of the needle as claimed in the present invention.

Another preferred enhancement of the invention lies in the fact that the direction of extension of the light guide in the end zone on the one hand, and the direction of extension of the light guide in the middle zone on the other hand form an angle, notably a right angle.

Through such an embodiment of the needle, it is advantageously possible to achieve a simple and effective assembly method with assembly steps that can be carried out rapidly.

A particularly preferred enhancement of the invention lies in the fact that the direction of extension of the light guide in the axial zone on the one hand, and the direction of extension of the light guide in the middle zone on the other hand form an angle, notably a right angle.

Through such an embodiment of the needle, it is advantageously possible to achieve an assembly method that is yet more simple and effective during a step of assembling the light guide.

Moreover, the present invention also relates to a method for assembling a needle for a display device as claimed in the present invention, the assembly method comprising a step of assembling the light guide with the top cover and a step of assembling the light guide with the bottom cover.

Through such an embodiment, the assembly method can be carried out in a simple and effective manner.

Other features and advantages of the invention will emerge from reading the following description of a particular, non limiting embodiment of the present invention.

BRIEF DESCRIPTION OF THE DRAWINGS

The invention will be better understood by virtue of the following description which relates to preferred embodiments given as non limiting examples and explained with reference to the appended schematic drawings, in which.

DESCRIPTION OF THE DRAWINGS

Figure 1:
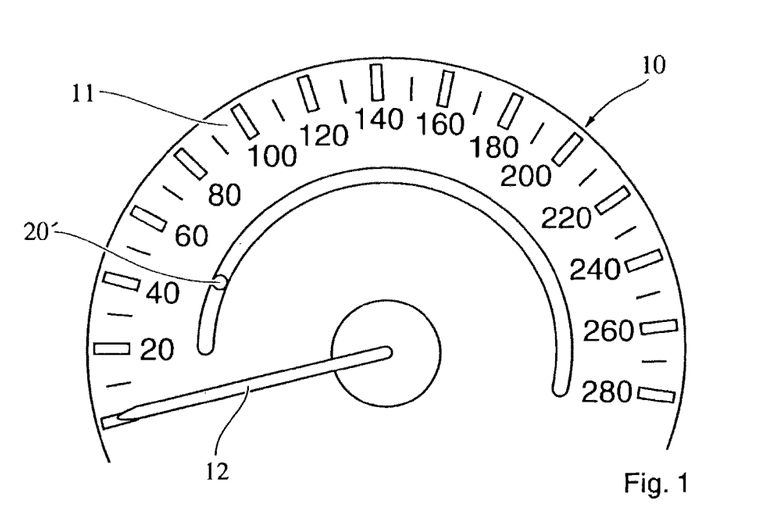
FIG. 1 is a schematic front view of a display device according to the present invention.

As shown in FIG. 1 of the appended drawing, a display device 10 according to the present invention comprises a display surface 11, notably in the form of a dial. FIG. 1 of the drawing shows the display device 10 as a user of the display device 10 sees it, notably as a driver of the vehicle in which the display device 10 is installed. From this perspective, only a luminous zone 20' can be seen on the display surface 11 for the display of an item of information, notably an item of aid information, and notably the value of a desired speed or the value of a speed limit to be observed or the value of a rotation speed. According to the present invention, a needle (not shown in FIG. 1) is provided for the display of the luminous zone 20' on the display surface 11.

The display device 10 may also comprise an additional needle 12 which is notably positioned on the front face of the display surface 11.

Figure 2:
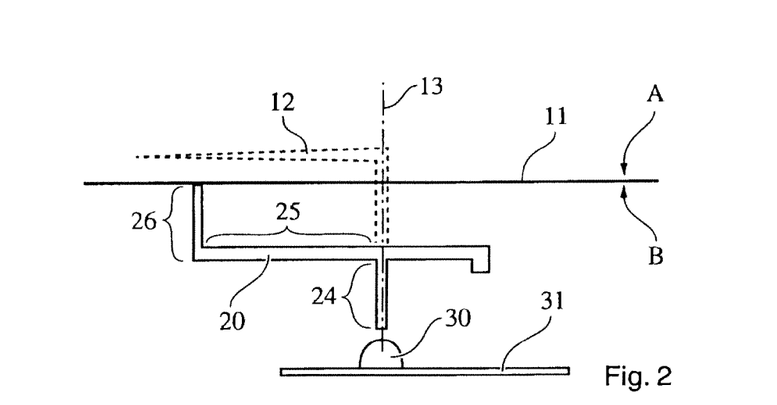
FIG. 2 is a schematic view in cross section of the display device according to the present invention.

FIG. 2 shows a schematic view in a cross section of the display device 10 according to the present invention. The front face A of the display surface 11 is the face that is visible to a user, notably a driver of the vehicle in which the display device 10 is installed. The rear face B of the display surface 11 is hidden from the view of the user. The needle 20 is on the rear face B of the display surface 11.

The needle 20 can be pivoted about an axis of rotation 13. The axis of rotation 13 is notably also the axis of rotation of the additional needle 12.

A light source 30 is provided in order to send light into a light guide (not shown in FIG. 2). The light guide conveys the light to the tip or the end portion of the needle 20. The needle comprises an axial zone 24, a middle zone 25 and an end zone 26. At the tip of the needle 20, the light comes out of the needle 20 and enters the display surface 11 in order to produce the luminous zone 20' on the display surface 11. The light source 30 is notably provided in the form of light-emitting diode (LED). The light source 30 can be positioned on a support 31, notably a printed circuit board (PCB). The light source 30 may notably form part of a light source device for lighting the backlighting of the scales of the display device. Through such an embodiment of the light source 30 in order to light up the needle, it is advantageously possible to produce the display device in a simple and low-cost manner, because a separate light source for the needle 20 can be avoided and the printed circuit board 31 can also be used to light up the needle 20.

Figure 3:
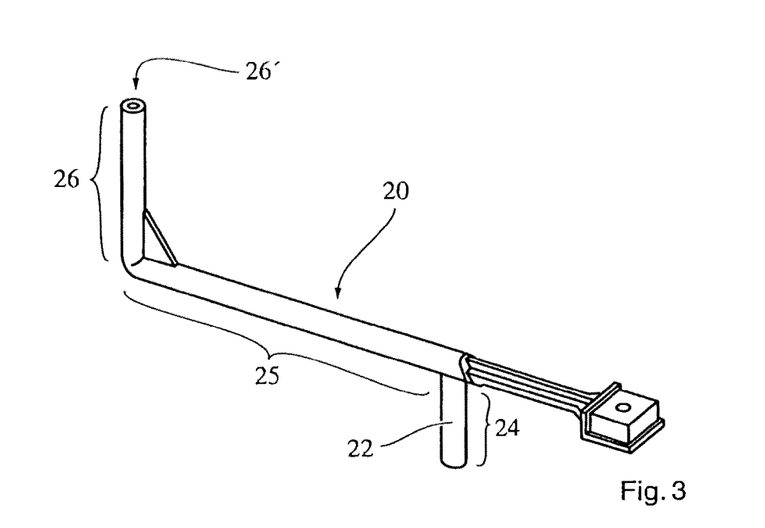
FIG. 3 is a schematic view in perspective of a needle for the display device according to the present invention.
Figure 4:
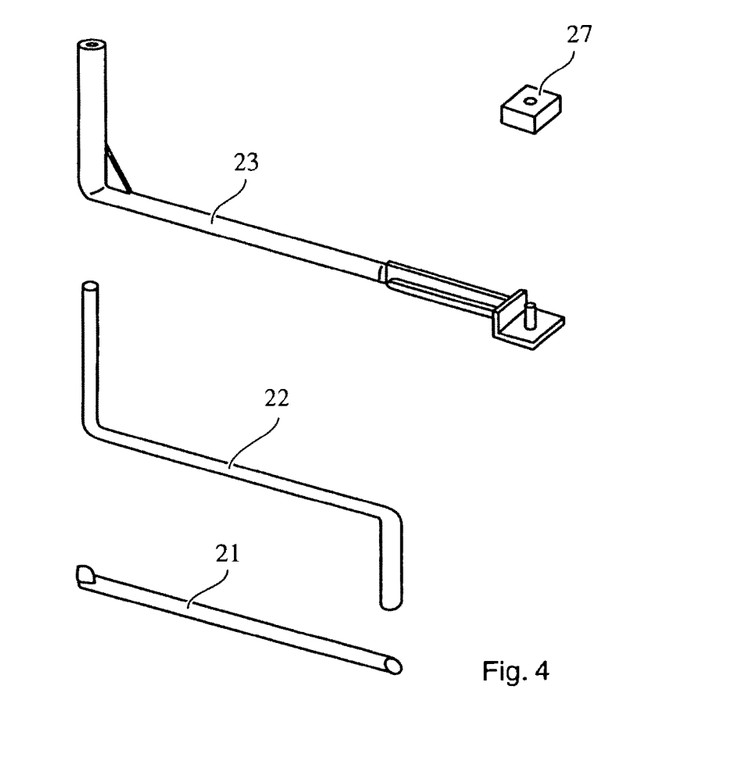
FIG. 4 is a schematic exploded view of the needle for the display device according to the present invention.
Figure 5:
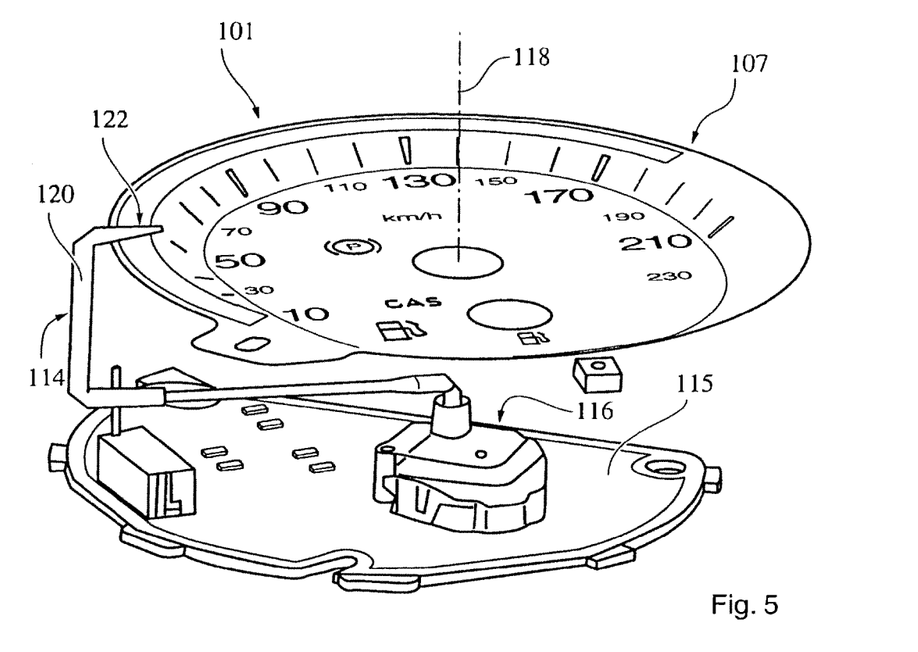
FIG. 5 is a schematic view in perspective of an indicator device according to the invention.

FIG. 3 shows a schematic view in perspective of the needle 20 for the display device 10 according to the present invention, and FIG. 4 shows the needle 20 in an exploded representation of the needle 20. From FIGS. 3 and 4, it is possible to see that the needle 20 comprises a casing in which the light guide 22 is positioned. With the exception of the axial portion 22 of the needle 20 and with the exception of the tip 26' of the needle 20, the light guide 22 is surrounded by the casing. Notably in the middle zone 25 of the needle 20, the casing surrounds the light guide 22. Therefore, it is advantageously possible to prevent or at least to reduce the light leaks which may have negative effects on the performance and the esthetic appearance of the display device 10.

The casing notably comprises a top cover 23 and a bottom cover 21. The light guide is between the top cover 23 and the bottom cover 21.

The assembly of the needle 20 can be carried out in a simple and effective manner by assembling the light guide 22 in an opening of the top cover 23 (in the end zone 26 of the needle 20) and by assembling the light guide 22 in an opening of the bottom cover 21 (in the axial zone 24 of the needle 20). The top and bottom covers 23, 21 can be attached to one another, for example via a snap fastening. A counterweight 27 is also provided to balance the needle 20.

With respect to the indicator device according to the present invention, such a device can be installed in a motor vehicle as shown in FIGS. 5 to 8. The indicator device may combine, for example, the display of an instantaneous speed and the display of a desired speed. The indicator device, and notably the needle of the indicator device, may also comprise a casing as described for the instance of the display device above in relation to FIGS. 1 to 4. Therefore, the negative effects of the light leaks can be reduced.

The indicator device is generally designated as 101 and comprises a supporting element 115 (notably in the form of a printed circuit board or a conducting plate) on which is mounted—in the example shown—an illumination member 119, notably in the form of a light-emitting diode, which can emit light.

A dial, generally designated as 107, has, for example, a round shape or ring shape and is positioned in the direction facing the user of the indicator device.

A needle 114 is mounted in such a manner relative to the dial 107 that the needle 114 can be turned in a rotary manner about an axis of rotation 118. The movement of the needle about the axis of rotation 118 is generally driven with the aid of a motor 116.

The needle 114 comprises a light guide 120 having an entrance portion 121 and an exit portion 122. According to the present invention, provision is made for the entrance portion 121 and the illumination member 119 to be positioned on the axis of rotation 118, notably so as to make it easier to transfer the light between the illumination member 119 on the one hand, and the entrance portion 121 on the other hand.

The needle 114 can be a needle of the bent type, that is to say a needle 114 that extends from the axis of rotation 118 radially toward a peripheral location of the indicator device 101 in order subsequently to extend axially relative to the axis of rotation 118 and to return radially over a portion of the distance between the axis of rotation 118 and the peripheral location in order to produce an exit portion 122 of the needle 114 or of the light guide 120 of the needle 114.

It is therefore possible to display and to illuminate the location of the needle 114 in a peripheral portion of the indicator device 101, notably in order to display a desired speed of the speed setting type or a setpoint value or else a dynamic speed value.

Figure 6:
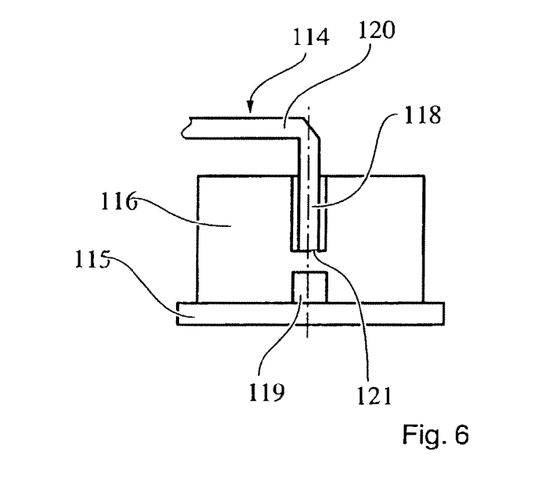
FIG. 6 is a schematic view in section of such an indicator device.
Figure 7:
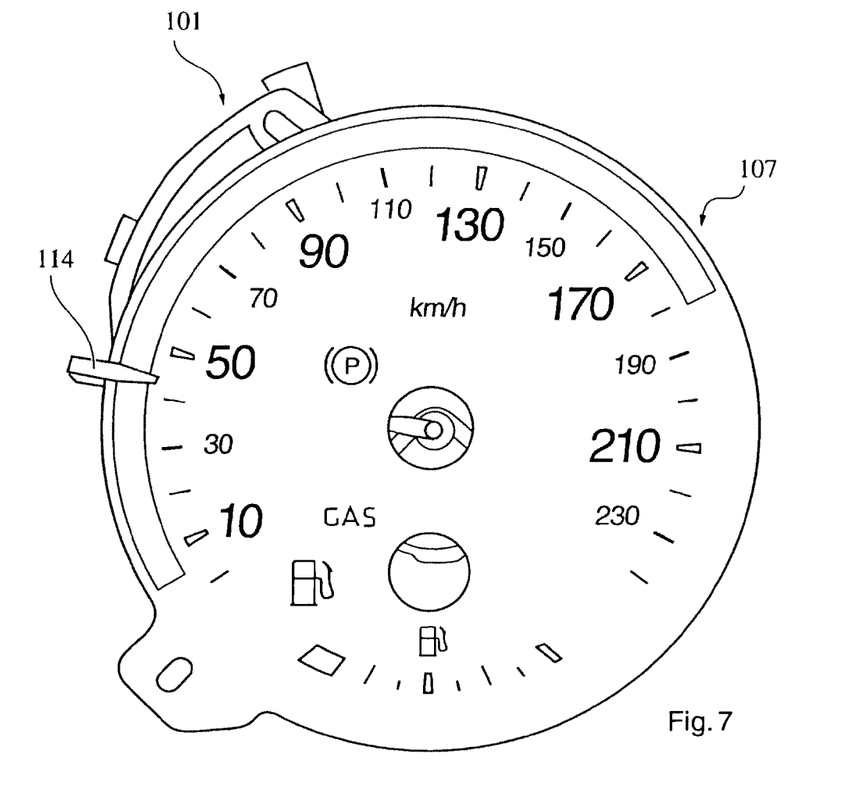
FIG. 7 is a schematic front view of such an indicator device.

As can be notably seen in FIG. 6, the motor 116 is either a motor with no rotation shaft or a motor with a rotation shaft having a recess (shaftless) in which the entrance portion of the light guide 120 of the needle can be housed in order to allow the transfer of the light from the illumination member 119 to the needle 114.

Figure 8:
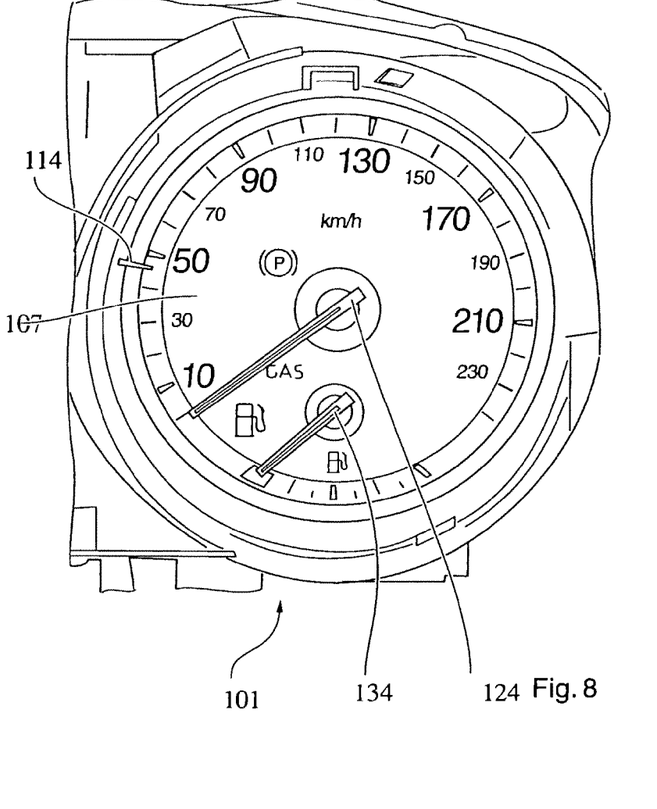
FIG. 8 is another schematic front view of such an indicator device.

As shown in FIG. 8, apart from the needle 114, the indicator device 101 may also comprise a second needle 124 and/or a third needle 134, the second and third needles being needles that are not bent, that is to say needles which extend axially relative to the axis of rotation 118 and which extend after the axis of rotation 118 radially to a peripheral location of the indicator device 101.

In an embodiment not shown, the needle 114 may also be made in an unbent manner (for example the second needle 124 can be of the bent type).

The invention claimed is:

1. An indicator device comprising:
a display surface, the display surface having a front face directed toward a user and a rear face; and
a needle being provided on the rear face of the display surface and being configured to rotate about an axis of rotation, the needle comprising a light guide, the light guide having an entrance portion and an exit portion, the entrance portion being positioned on the axis of rotation; and
at least one illumination member, the illumination member being positioned on the axis of rotation:
wherein the needle comprises an axial zone, a middle zone and an end zone,
wherein the needle comprises at least one casing element, the at least one casing element surrounding the needle at least in the middle zone, the at least one casing element comprising a top cover and a bottom cover, the light guide being positioned between the top cover and the bottom cover,
wherein the needle further comprises a counterweight, the counterweight being attached to the top cover, and
wherein one end of the end zone is configured to let light, which has passed the light guide, out of the needle so as to produce a luminous zone on the display surface.

2. The indicator device as claimed in claim 1, wherein the entrance portion of the light guide is positioned opposite to the at least one illumination member.

3. The indicator device as claimed in claim 1, wherein the entrance portion and the at least one illumination member are positioned so as to be centered on the axis of rotation.

4. The indicator device as claimed in claim 1, wherein the at least one illumination member is positioned fixedly to a support element including at least one of a printed circuit board and a conducting plate.

5. The indicator device as claimed in claim 1, wherein the indicator device comprises a motor connected to the needle so as to be able to turn the needle about the axis of rotation, the motor being a stepping motor.

6. The indicator device as claimed in claim 5, wherein the motor is at least one of a motor without a rotation shaft and a motor with a rotation shaft having a recess.

7. The indicator device as claimed in claim 6, wherein the entrance portion of the light guide is positioned in the recess.

8. The indicator device as claimed in claim 1,
wherein the needle is a needle of a bent type, and
wherein the needle extends from the axis radially toward a peripheral location of the indicator device in order subsequently to extend axially relative to the axis and to return radially over a portion of a distance between the axis of rotation and the peripheral location so as to form an exit portion of the needle.

9. The display device as claimed in claim 1, wherein the top cover surrounds the light guide for a substantial portion of the end zone.

10. The display device as claimed in claim 1, wherein an area of a cross section of the light guide is essentially constant between the end zone and the axial zone.

11. The display device as claimed in claim 1, wherein a cross section of the light guide is essentially round.

12. The display device as claimed in claim 1, wherein a direction of extension of the light guide in the end zone and a direction of extension of the light guide in the middle zone form a right angle.

13. The display device as claimed in claim 1, wherein a direction of extension of the light guide in the axial zone and a direction of extension of the light guide in the middle zone form a right angle.

14. A method for assembling a needle for a display device as claimed in claim 1, wherein the assembly method comprises:
   assembling the light guide with the top cover, and
   assembling the light guide with the bottom cover.

15. A method for producing a luminous zone on a display surface of an indicator device, the method comprising:
   providing a needle on a rear face of the displace surface rotatable about an axis of rotation, the needle comprising an axial zone, a middle zone, and an end zone;
   providing the needle with at least one casing element, the at least one casing element being formed by attaching a top cover and a bottom cover together;
   positioning a light guide between the top cover and the bottom cover, the light guide having an entrance portion and an exit portion;
   positioning the entrance portion on the axis of rotation;
   positioning an illumination member on the axis of rotation, the illumination member sending light into the light guide, and the light guide conveying the light from the illumination member to an end of the end zone of the needle,
   attaching a counterweight to the top cover, and
   arranging the end such that the end lets light which has passed the light guide out of the needle so as to produce the luminous zone on the display surface.

* * * * *